United States Patent Office 3,313,858
Patented Apr. 11, 1967

3,313,858
ISOMERIZATION OF NON-TERMINAL OLEFINS
Alfred Clark, Benedict H. Ashe, Jr., and Jack N. Finch, Bartlesville, Okla., assignors to Phillips Petroleum Company, a corporation of Delaware
No Drawing. Filed Feb. 12, 1965, Ser. No. 432,414
5 Claims. (Cl. 260—666)

This invention relates to a process for isomerizing cyclic and non-terminal acyclic olefins having from 5 to 10 carbon atoms with an improved silica-alumina catalyst.

The isomerization of olefins is a well-known phenomenon. The double bond present in olefin hydrocarbons is generally labile and it shifts rather readily over a number of catalysts in several processes. However, the isomerization is frequently accompanied by other undesirable side reactions such as cracking, dehydrogenation, polymerization, and the like. Silica-alumina is an example of a catalyst which has appreciable isomerization activity but which also tends to produce polymerized products as well.

This invention is concerned with an improved process for isomerizing cyclic and non-terminal acyclic olefins of 5 to 10 carbon atoms per molecule which minimizes polymerization.

Accordingly, it is an object of the invention to provide an improved isomerization process for the isomerization of cyclic and non-terminal olefins which minimizes side reactions such as cracking, dehydrogenation, polymerization, and the like. Another object is to provide an olefin isomerization process utilizing an improved isomerization catalyst which minimizes polymerization effects when isomerizing cyclic and non-terminal olefins of 5 to 10 carbon atoms. Other objects of the invention will become apparent to one skilled in the art upon consideration of the accompanying disclosure.

A broad aspect of the invention comprises contacting cyclic and non-terminal acyclic olefins of 5 to 10 carbon atoms under isomerizing conditions with a silica-alumina catalyst or composite which contains or has been impregnated with at least one metal oxide selected from the group consisting of chromium and nickel oxides. The metallic ions on the surface of the silica-alumina tend to block the polymerization sites and allow the isomerization products to survive. It has been found that the olefins of the class described can be isomerized in this manner with a minimum of simultaneous polymerization if the catalyst (silica-alumina) is first treated with nickel or chromium ions. The effect of these metal ions is to suppress polymerization. That such an effect can be obtained with nickel or chromium is indeed surprising since both of these metals are well known components of catalysts used for dimerizing or making heavy polymers of a large number of olefins.

The cyclic olefins to which the invention is applicable are those which contain a double bond between two carbon atoms at least one of which is a ring carbon atom. Included are those alkyl-substituted cyclic monoolefins having 5 to 10 carbon atoms per molecule in which the double bond occurs within the ring, e.g., 1-ethylcyclopentene, as well as those alkylene-substituted cyclic hydrocarbons which contain a double bond between a carbon atom of the side chain and a carbon atom in the ring, e.g., methylenecyclohexane. Other applicable cyclic olefins are 1-methylcyclobutene, 1-methylcyclohexene, 3-methylcyclohexene, 4-butylidenecyclohexane, 3-ethylcyclopentene, and the like.

Acyclic non-terminal olefins having 5 to 10 carbon atoms per molecule and which are applicable as feeds for this invention include both branched and unbranched monoolefins, e.g., 2-methyl-3-heptene and 3-octene, as well as cycloalkyl-substituted acyclic olefins in which the double bond is in a position other than an end position on the acyclic chain, e.g., 1-cyclohexyl-2-butene. Other applicable acyclic olefins include 2-hexene, 2-methyl-2-butene, 2-pentene, 4-decene, and the like. When contacted with the catalysts and under the conditions of this invention, such applicable olefins isomerize principally by movement of the double bond.

The silica-alumina catalysts or composites applicable in this invention are well known in the art. These are conventional high surface area materials in which the silica is in the range of about 20 to 95, preferably, about 85 weight percent of the composite.

For use in the invention the silica-alumina catalyst is impregnated with nickel and/or chromium compounds which are convertible to the oxides on calcination. Following impregnation the impregnated catalyst is dried and calcined at a temperature in the range of about 800 to about 1500° F. for a time in the range of about 1 to about 20 hours. Such catalysts and their preparation are conventional and well known in the art. The finished catalyst will contain from about 0.1 to about 10 weight percent of the nickel and/or the chromium (calculated as the metal though present as the oxide). Generally, greater quantities of the impregnated metal are required for use in isomerization reactions at higher temperatures than in conversions carried out at lower temperatures.

The process of the present invention is carried out in either batch or continuous operation. Thus, in a simple batch type process, the olefin is brought to a reaction temperature in the range of about 100 to about 300, preferably 150–250° C., in the presence of the above-described catalyst composition and at pressures which are in the range of about 0 to 2000 p.s.i.g. The reaction mixture is stirred mechanically or otherwise agitated to effect intimate contact between the catalyst and the olefinic hydrocarbon charging stock. The reaction may be carried out either in the presence of or in the absence of a diluent. Paraffinic hydrocarbons having up to about 12 carbon atoms per molecule can be used as diluent. The presence of oxygen in the reaction zone is sometimes beneficial.

Alternatively, the isomerization can be carried out in a continuous manner. Thus, the olefin feed can be continuously fed into a reactor, such as one containing a slurry of catalyst or a fixed bed of catalyst, and a stream of products as well as unconverted olefin can be continuously withdrawn. Any conventional type of contacting device can be used. Contact times can vary widely and can range from 0.1 minute to 20 hours.

At the completion of the reaction the products can be separated and isolated by conventional means such as by fractionation, adsorption, and the like. Unconverted olefins as well as some product olefins can be recycled if desired.

The theoretical reason for the success of the present invention is not completely understood, however it is believed that the polymerization activity of the silica-alumina is due to its acidic sites having relatively high energies. Further, these sites appear to have a relatively narrow range such that when metal ions are applied to the catalyst they are adsorbed on or near these sites of high energy thereby blocking them. Sites of lower energy, including those active for isomerization, remain relatively free to exert their catalytic action.

The invention can be further illustrated by the following examples.

EXAMPLES

A number of olefin isomerization runs were carried out utilizing as a catalyst a conventional silica-alumina having about 87 weight percent silica, the balance being alumina. This catalytic grade material was ground, sieved, and the 30–60 mesh fraction was used as a support for the chromium and nickel containing catalysts. The chromium oxide catalysts were prepared by impregnating the silica-alumina with aqueous solutions of chromium trioxide of the proper concentration. The impregnated catalysts were dried at 110° C. and then calcined at 500° C. in a stream of dry air for 5 hours. Nickel oxide catalysts were similarly prepared using a solution of nickel nitrate for impregnation. The nickel oxide was activated for 1 hour at 500° C.

The isomerization runs were carried out in a rocking autoclave of either a 200 ml. or 43 ml. capacity. A typical charge for the 200 ml. reactor consisted of 20 ml. of cyclohexane, 10 ml. of reactant, and 6 ml. of catalyst. The charge for the 43 ml. reactor consisted of 14 ml. of cyclohexane, 3 ml. of reactant, and 3 ml. of catalyst.

The autoclave was sealed and the reaction was carried out under autogenous pressure for a period of 2 hours after the reaction temperature had been reached. Heating time to reaction temperature was generally from 1½ to 2 hours.

At the end of the 2 hour reaction period the reactor was removed and chilled in ice water. An analysis of the products was by gas-liquid chromatography without prior separation of the solvent. The products were also examined by means spectrometry.

Tables I–V show the essential conditions and results of a number of runs which were carried out using different reactants and different conditions.

TABLE I.—REACTION OF METHYLCYCLOHEXENES (MCH″) AND METHYLENECYCLOHEXANE (M″CH) OVER SILICA-ALUMINA, 2½% NICKEL, AND 2½% CHROMIUM CATALYSTS ON SILICA-ALUMINA

| Run No. | Catalyst | Wt. percent in Product | | | | | Conv., percent | Isom/Poly |
|---|---|---|---|---|---|---|---|---|
| | | 1-MCH″ | 3-MCH″ | 4-MCH″ | X[a] | Heavies | | |
| 1-methylcyclohexene at 200° C.[b] | | | | | | | | |
| 1 | Si/Al | 5.8 | 0.5 | 0.5 | 0 | 93.2 | 94.0 | 0.01 |
| 2 | Ni/Si/Al | 27.7 | 3.6 | 4.5 | 3.6 | 60.7 | 72.1 | 0.13 |
| 3 | Cr/Si/Al | 80.5 | 5.7 | 5.2 | 6.3 | 2.3 | 19.3 | 4.8 |
| 4-methylcyclohexene at 200° C.[b] | | | | | | | | |
| 4 | Si/Al | <1 | 0 | 0 | 0 | >99 | [c]>99 | [c]~0 |
| 5 | Ni/Si/Al | 6.7 | 1.2 | 2.4 | 1.8 | 87.9 | 97 | 0.04 |
| 6 | Cr/Si/Al | 51.8 | 8.2 | 11.8 | 4.5 | 23.7 | 87 | 2.1 |
| Methylenecyclohexane at 150° C.[b] | | | | | | | | |
| 7 | Si/Al | 40.7 | 2.9 | 4.3 | 0 | 52.1 | 100 | 0.92 |
| 8 | Ni/Si/Al | 60.5 | 4.1 | 4.1 | 0 | 31.3 | 100 | 2.2 |
| 9 | Cr/Si/Al | 99.5 | 0 | 0 | 0 | 0.5 | 100 | 200 |

[a] Unidentified light products.
[b] Feed compositions:
    1-MCH″: 99.8% 1-MCH″, 0.2% 3-MCH″.
    4-MCH″: 3.0% 1-MCH″, 7.9% 3-MCH″, 89.0% 4-MCH.
    M″CH: 99+% M″CH.
[c] Conversion based on 4-MCH″ only; isom/poly based on net 1- and 3-MCH″, surviving.

The data in the above table show that 1-methylcyclohexene, 4-methylcyclohexene, and methylenecyclohexane are isomerized with less concurrent polymerization when using silica-alumina catalysts which have been treated with nickel or chromium oxides than when using untreated silica-alumina. It is seen that the chromium oxide is more effective than the nickel oxide for this purpose.

TABLE II.—EFFECT OF REACTION TEMPERATURE ON CONVERSION OF 4-METHYLCYCLOHEXENE OVER 2½% CHROMIUM CATALYST ON SILICA-ALUMINA

| Run No. | T., °C. | 1-MCH″ | 3-MCH″ | 4-MCH″ | M″CH | X | Heavies | Isom/Poly |
|---|---|---|---|---|---|---|---|---|
| 1 | 100 | 5.3 | 9.5 | 85.2 | 0 | 0 | 0 | ∞ |
| 2 | 150 | 26.6 | 17.2 | 56.2 | 0 | 0 | 0 | ∞ |
| 3 | 200 | 51.8 | 8.2 | 11.8 | 0 | 4.5 | 23.7 | 2.1 |
| 4 | 250 | 25.9 | 5.4 | 8.0 | 0.9 | 9.8 | 50.0 | 0.41 |

The data above show that 4-methylcyclohexene can be converted to isomerization products with greater selectivity at temperatures closer to 100° C. rather than 250° C.

TABLE III.—EFFECT OF CHROMIUM CONCENTRATION ON CONVERSION OF 2-HEXENE OVER CHROMIUM CATALYST ON SILICA-ALUMINA AT 250° C.

| Run No. | Percent Cr | $C_6$ olefins | n-$C_6H_{14}$ | Other hexanes | 2-$C_6H_{12}$ | Other hexenes | Net total isomers | Heavies | Isom/Poly | Conv. percent |
|---|---|---|---|---|---|---|---|---|---|---|
| Feed | | 0 | 0 | 0 | 98.7 | 1.3 | 1.3 | | | |
| 1 | 0 | 4.0 | 1.9 | 11.5 | 16.5 | 10.8 | 21.0 | 55.3 | 0.38 | 83 |
| 2 | 0.01 | 8.6 | 2.1 | 11.5 | 16.8 | 12.8 | 23.0 | 48.2 | 0.48 | 83 |
| 3 | 0.1 | 9.2 | 3.4 | 14.2 | 15.8 | 11.5 | 24.4 | 45.9 | 0.53 | 84 |
| 4 | 0.25 | 7.0 | 2.6 | 22.0 | 16.7 | 12.1 | 32.8 | 39.6 | 0.83 | 83 |
| 5 | 1.0 | 6.1 | 1.8 | 15.1 | 20.2 | 13.0 | 26.8 | 43.8 | 0.61 | 80 |
| 6 | 2.5 | 0.2 | 0 | 2.4 | 37.4 | 34.4 | 35.5 | 25.7 | 1.4 | 62 |
| 7 | 5.0 | 0 | 0 | 0.3 | 67.8 | 30.0 | 29.0 | 1.9 | 15 | 31 |

The data in the table above show that the quantity of chromium in the catalyst influences the selectivity of the conversion of 2-hexene is isomerization products at 250° C. Within the range shown, increasing quantities of chromium in the catalyst reduce the tendency for the formation polymerized products.

TABLE IV.—REACTION OF 2-HEXENE OVER SILICA-ALUMINA, 2½% NICKEL, AND 2½% CHROMIUM CATALYSTS ON SILICA-ALUMINA

| Run No. | Catalyst | Temp., °C. | Cy-C$_6$H$_{10}$ | n-C$_6$H$_{14}$ | 1-C$_6$H$_{12}$ | 3-C$_6$H$_{12}$ | 2-C$_6$H$_{12}$ | Heavies | Isom/Poly | Conv. percent |
|---|---|---|---|---|---|---|---|---|---|---|
| Feed | | | 0 | 0 | 0 | 4.5 | 95.5 | 0 | | |
| 1 | Si/Al | 200 | 12.0 | 0 | 7.0 | 0 | 5.0 | 72.0 | 0.097 | 95 |
| 2 | Si/Al | 150 | 0 | 0 | 2.7 | 9.2 | 31.2 | 56.9 | 0.13 | 67 |
| 3 | Cr | 200 | 0 | 2.1 | 4.1 | 22.1 | 68.3 | 3.4 | 6.4 | 28 |
| 4 | Cr | 150 | 0 | 0 | 3.3 | 23.5 | 71.9 | 1.3 | 17 | 25 |
| 5 | Ni | 200 | 2.6 | 5.3 | 3.5 | 7.0 | 29.9 | 51.7 | 0.12 | 68 |
| 6 | Ni | 150 | 0.8 | 1.5 | 2.3 | 13.7 | 45.1 | 36.6 | 0.31 | 53 |
| 7 [1] | Ni | 200 | 0.9 | 2.9 | 2.7 | 8.7 | 32.0 | 51.9 | 0.14 | 67 |

[1] No cyclohexane solvent. Products also included 0.4% 2,2-dimethylbutane.

These data shows that 2-hexene can be effectively isomerized at 150 and 200° C. and again show that chromium in the catalyst is more effective than nickel.

TABLE V.—EFFECT OF CATALYST ACTIVATION TEMPERATURE [1]

| Run No. | Feed | Catalyst | Run Temp., °C. | Activ. Temp., °C. | Net isom., percent | Heavies, percent | Isom/Poly | Conv., percent |
|---|---|---|---|---|---|---|---|---|
| 1 | 4-MCH" | Si/Al | 200 | 500 | 0 | >99 | 0 | 100 |
| 2 | 4-MCH" | Si/Al | 200 | Unact.[2] | 52.0 | 19.7 | 2.6 | 81 |
| 3 | 4-MCH" | 2½% Cr | 200 | 500 | 49.1 | 23.7 | 2.1 | 87 |
| 4 | 4-MCH" | Si/Al | 250 | Unact.[2] | 4.9 | 44.2 | 0.11 | 56 |
| 5 | 4-MCH" | 2½% Cr | 250 | Unact.[2] | 11.9 | 41.6 | 0.29 | 62 |
| 6 | 4-MCH" | 2½% Cr | 250 | 500 | 0.9 | 43.7 | 0.02 | 62 |

[1] Activation in a stream of dry air for 5 hours at the indicated temperature.
[2] In runs 2, 4 and 5 the feed, solvent, and catalyst were charged in air when the catalyst was not activated; charging was under dry nitrogen in all other runs.

The data in Table V indicate that the activation temperature of the catalyst does not appear to be critical in the isomerization process. Indeed, the catalyst need not be activated at all. It must be remembered, though, that the run itself serves to some extent as an activation at run temperature.

Three of the runs in the above table were carried out using an unactivated catalyst and also in the presence of a small amount of air which was admitted with the charging of this unactivated catalyst. The results of these runs indicate that the presence of the oxygen contributed to improved isomerization/polymerization ratios.

Certain modifications of the invention will become apparent to those skilled in the art and the illustrative details disclosed are not to be construed as imposing unnecessary limitations on the invention.

We claim:
1. A process for isomerizing a hydrocarbon feed selected from the group consisting of cyclic olefins in which the double bond is between two C's, at least one of which is a ring C of 5 to 10 carbon atoms, which comprises contacting said feed under isomerizing conditions including a temperature in the range of 100 to 300° C. and a pressure in the range of 0 to 2000 p.s.i.g. with a silica-alumina composite in which the silica is in the range of 20 to 95 weight percent and which contains at least one oxide of a metal selected from the group consisting of chromium and nickel in an amount in the range of about 0.1 to 10 weight percent calculated as metal, said catalyst having been oxidized at high temperature, so as to isomerize said feed by shifting the double bond, and recovering resulting isomer.

2. The process of claim 1 wherein said feed comprises principally methylcyclohexenes.

3. The process of claim 1 wherein said feed comprises principally methylenecyclohexane.

4. The process of claim 1 wherein said metal oxide is chromium oxide and the silica-alumina composite contains silica in the range of 75 to 95 weight percent.

5. The process of claim 1 wherein said contacting is effected in the presence of free oxygen.

References Cited by the Examiner
UNITED STATES PATENTS

| 2,342,248 | 2/1944 | Burk | 260—683.2 |
| 2,403,671 | 7/1946 | Matuszak | 260—683.2 |
| 2,485,964 | 10/1949 | Good et al. | 260—666 |
| 2,653,981 | 9/1953 | Hogan | 260—683.2 |

DELBERT E. GANTZ, Primary Examiner.

V. O'KEEFE, Assistant Examiner.